United States Patent [19]
Ikkala et al.

[11] Patent Number: 5,929,168
[45] Date of Patent: Jul. 27, 1999

[54] POLYPHENYLENE ETHER BLENDS AND A PROCESS FOR THE PREPARATION THEREOF

[75] Inventors: Olli Ikkala; Lars-Olof Pietilä; Riitta Holsti-Miettinen, all of Helsinki; Nikitas Katsaras, Porvoo; Maaria Seläntaus, Helsinki; Heidi Österholm, Porvoo; Christer Bergström, Espoo, all of Finland

[73] Assignee: Optatech, Corporation, Espoo, Finland

[21] Appl. No.: 08/737,497

[22] PCT Filed: May 19, 1995

[86] PCT No.: PCT/FI95/00275

§ 371 Date: Nov. 19, 1996

§ 102(e) Date: Nov. 19, 1996

[87] PCT Pub. No.: WO95/32243

PCT Pub. Date: Nov. 30, 1995

[30] Foreign Application Priority Data

May 19, 1994 [FI] Finland ................................. 942324

[51] Int. Cl.⁶ ............................. C08L 71/12; C08K 5/13
[52] U.S. Cl. ........................... 525/132; 525/397; 524/347
[58] Field of Search ...................... 525/132, 397; 524/347

[56] References Cited

U.S. PATENT DOCUMENTS

| | | | |
|---|---|---|---|
| 4,532,306 | 7/1985 | Sugio | 525/132 |
| 4,659,763 | 4/1987 | Gallucci | 525/397 |
| 4,808,647 | 2/1989 | Ablonis | 525/132 |
| 4,914,153 | 4/1990 | Togo | 525/397 |
| 4,970,272 | 11/1990 | Gallucci | 524/347 |
| 5,418,287 | 5/1995 | Tanaka | 525/132 |
| 5,475,054 | 12/1995 | Abe | 525/92 B |

FOREIGN PATENT DOCUMENTS

| | | |
|---|---|---|
| 0 268 486 A3 | 5/1988 | European Pat. Off. . |
| 0 270 247 A2 | 6/1988 | European Pat. Off. . |
| 0 270 247 A3 | 6/1988 | European Pat. Off. . |
| 0 305 878 A3 | 3/1989 | European Pat. Off. . |
| 0 308 671 A3 | 3/1989 | European Pat. Off. . |
| 0 391 733 A2 | 10/1990 | European Pat. Off. . |
| 0 435 504 A3 | 7/1991 | European Pat. Off. . |
| 0 467 113 A1 | 1/1992 | European Pat. Off. . |
| 0 485 598 A1 | 5/1992 | European Pat. Off. . |
| 0 491 188 A2 | 6/1992 | European Pat. Off. . |
| 0 491 188 A3 | 6/1992 | European Pat. Off. . |
| 0 496 119 A1 | 7/1992 | European Pat. Off. . |
| 0 524 705 A3 | 1/1993 | European Pat. Off. . |
| 0 560 447 A1 | 9/1993 | European Pat. Off. . |
| 0 572 919 A1 | 12/1993 | European Pat. Off. . |
| 0 577 208 A1 | 1/1994 | European Pat. Off. . |
| 0 605 195 A2 | 7/1994 | European Pat. Off. . |
| 0 610 890 A2 | 8/1994 | European Pat. Off. . |
| 185350 | 11/1982 | Japan .................................. 525/132 |

*Primary Examiner*—David Buttner
*Attorney, Agent, or Firm*—Cohen, Pontani, Lieberman & Pavane

[57] ABSTRACT

The present invention concerns polymer blends and processes for the preparation thereof. The present blends contain a) 5 to 95 parts by weight of poly(2,6-dimethyl-1,4-phenylene)ether, b) 95 to 5 parts by weight of a second polymer which is immiscible therewith, and c) a component (a compatibilizer) which enhances the compatibility of the polymers. According to the invention the component enhancing the compatibility of the polymers comprises 0.1 to 10%, preferably about 1.5 to 10%, calculated on basis of the total weight of components a and b, of at least one compound C, which has the formula $$A_i\text{---}B_j \qquad \text{I}$$

wherein

A stands for a group which contains at least one ring with 3 to 7 members, capable of forming ring-to-ring interactions with the phenyl rings of poly(2,6-dimethyl-1,4-phenylene)ether, B is a polar group, i is an integer 1 to 20, and j is an integer 0 to 20, whereat i+j is greater than or equal to 2, the melting point of compound C is above 50° C. and the boiling point thereof above 200° C. (at 760 mmHg) and c compound C is capable of at least partially dissolving poly(2,6-dimethyl-1,4-phenylene)ether and is preferably a hydroquinone derivative.

13 Claims, 1 Drawing Sheet

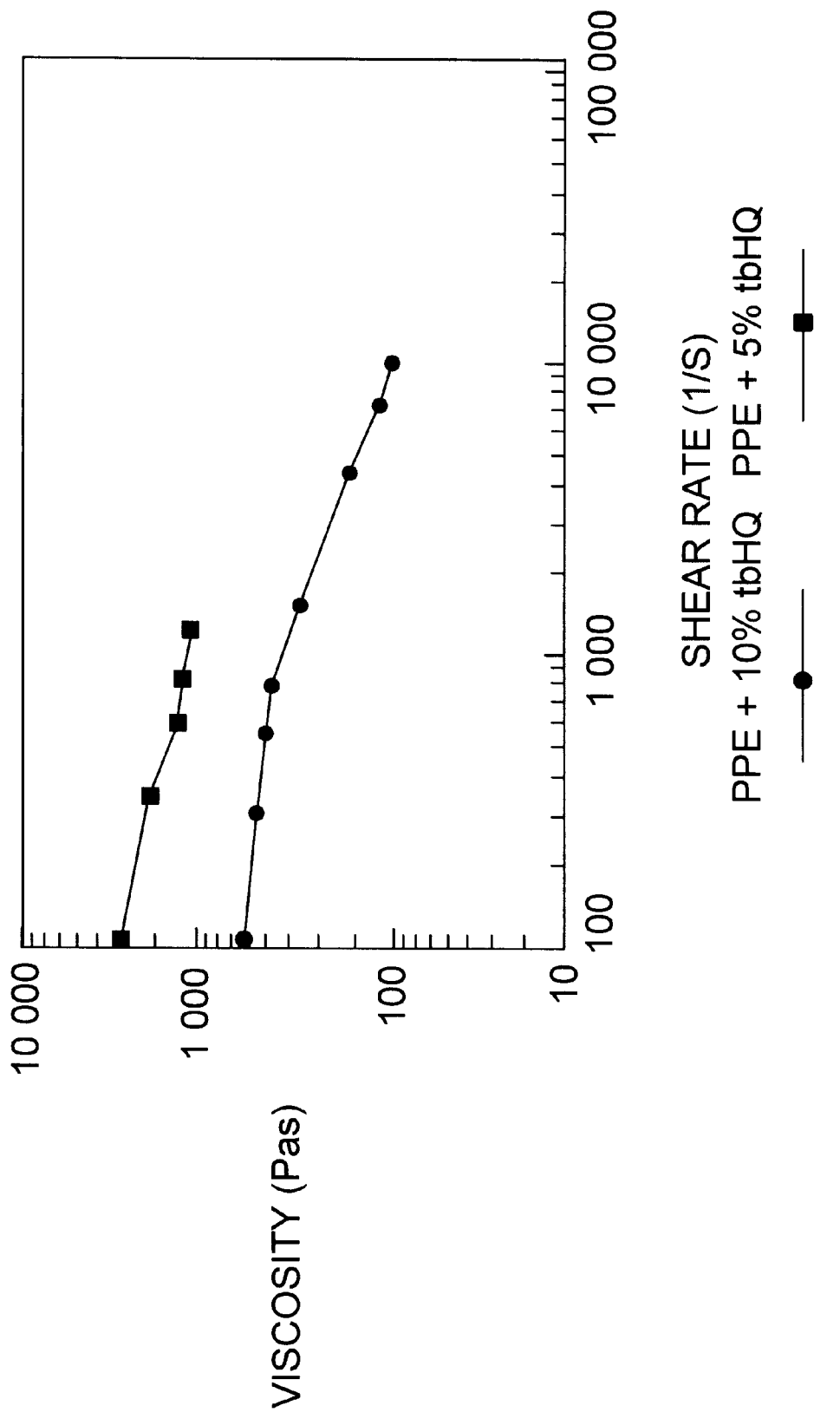

POLYPHENYLENE ETHER BLENDS AND A PROCESS FOR THE PREPARATION THEREOF

BACKGROUND OF THE INVENTION

The present invention concerns a polymer blend which is useful for producing fibers, coatings and films.

Such a blend generally comprises 5 to 95 parts by weight of poly(2,6-dimethyl-1,4-phenylene) ether, 95 to 5 parts by weight of a polymer other than polyamide, which is immiscible therewith, and a component (a compatibilizer) which enhances the compatibility of said polymers.

The invention also concerns a process for the preparation of novel polymer blends and new products containing said blends.

Poly(2,6-dimethyl-1,4-phenylene) ether (PPE) is formed by alternating methyl-substituted phenyl rings and ether groups. PPE is an almost amorphous thermoplastic polymer. Its glass transition temperature ($T_g$) is generally in the range from 205 to 210° C. Its degree of crystallinity is typically a few percent. The melting point of the crystals is in the range from 262 to 267° C. (Polym. Prepr. 1971, 12, 317). It should be pointed out that a particular advantage of PPE lies in the fact that the polymer behaves plastically at very low temperatures, even at −200° C. The heat resistance of PPE is high (HDT/A 174° C.).

Since PPE is very aromatic it is also rather rigid. Therefore, PPE is an interesting polymeric blending component for providing stiffness and for increasing strength. However, the melt index of PPE is very high; in other words, it is almost impossible to process it by using traditional polymer melt processing techniques, such as injection moulding or extrusion. Because of the high melt viscosity, the processing temperature should be increased over 300° C., at which temperature it becomes difficult to blend the polymer with other polymers which have lower melting points. Furthermore, even in oxygen-free conditions, PPE is thermally stable only at temperatures of up to about 250° C., and when the temperature is raised over 300° C. gelling will be initiated.

It is known in the art that the viscosity of polymers can generally be lowered by using plasticizers. Plasticizers can also be used to improve processibility, flexibility and elasticity (ASTM D 833). Proper action of the plasticizer requires that the polymer and the plasticizer be sufficiently miscible with each other. Generally, the plasticizer should be soluble in the polymer which is to be plasticized or vice versa. Each polymer has its own specific plasticizer, because dissolution depends on the chemical compatibility of the polymer which is to be plasticized and the dissolving admixture.

It is also known in the art that when a very small amount of a plasticizer is used, which is completely miscible with the polymer, it is possible to increase the stiffness, strength and toughness of the polymer. This phenomenon is called "antiplasticizing". Generally, said phenomenon and its basis for polymers have been described extensively in the literature (Adv. Chem Ser., 48, 185 (1965), J. Appl. Polym. Sci., 11, 211 (1967), J. Appl. Polym. Sci., 11, 227 (1967), J. Macromol. Sci.-Phys., B1, 433 (1967), Polym. Eng. Sci., 9, 277 (1969), J. Polym. Sci. Polym. Lett. Ed., 7, 35 (1969), Polym. J. 4, 23 (1973), Polym. J., 4, 143 (1973), J. Macromol. Sci.,-Phys., B14, 251 (1977), J. Pol. Sci., J. Appl. Poly. Sci., 23, 1935 (1979), J. Appl. Poly. Sci., 11, 2553 (1967), J. Appl. Poly. Sci., 17, 2173 (1973), J. Appl. Phys., 43,4318, (1972), A. Bondi, Physical Properties of molecular Crystals, Liquids and Glasses, Wiley, 1968, J. Polym. Sci. Polym. Lett. Ed., 21, 1041 (1983), ACS Symp. Ser., 223, 89 (1983), J. Pol. Sci., Part B, 25, 957 (1987), J. Pol. Sci., Part B. 25, 981 (1987), J. Pol. Sci., Part B, 25, 1005 (1987), Macromolecules 21, 1470 (1988)). Said publications deal with the influence of the admixture on the mechanical properties, volume and glass transition of the polymer, but they do not address, for example, the influence of the admixture on the compatibility of the polymer with another polymer.

PPE is conventionally made processible by using a polymer, viz. polystyrene, as plasticizer. Polystyrene is blended with PPE, which is miscible with polystyrene at all mixing ratios. The properties of the PPE/PS-blend so formed can be controlled by adjusting the mixing ratios. Polystyrene lowers the viscosity of the PPE and improves the flow properties of the polymer blend. PPE is in a corresponding way at least partially miscible with and soluble in polymers which are similar to polystyrene, such as isotactic polystyrene, poly(p-methylstyrene), poly(α-methylstyrene), copolymers of halostyrene and styrene, poly(2-methyl-6-phenyl-1,4-phenylene) ether, and poly(2-methyl-6-benzyl-1,4-phenylene) ether.

Plasticizing of PPE with high impact polystyrene (HIPS) produces a blend, which, due to its impact strength and other properties, is of great importance as a structural polymer material in components used in the automotive industry and in the industry producing electrical appliances. PPE/HIPS blends are processible by conventional melt processing methods. The proportion of HIPS in the blends can vary widely depending on the specific application. However, it is often 50 to 80 wt-%. Stiffness and tensile strength decrease as the concentration of HIPS increases, as will be shown in an example given below. When the proportion of HIPS is diminished, the processing of the polymer blend becomes more difficult.

U.S. Pat. No. 4,826,919 teaches further improvement of the flow properties of PPE/HIPS blends by using small amounts of triphenyl phosphate, mineral oil, silicon oil and polyolefins. However, the mechanical properties, such as the impact strength, tensile strength and heat resistance, are impaired by such additions.

The prior art, J. Pol. Sci., Part B, 25, 957 (1987), J. Pol. Sci., Part B, 25, 981 (1987), J. Pol. Sci., Part B, 25, 1005 (1987), Macromolecules 21, 1470 (1988), also teaches plasticizing PPE by using oligomeric plasticizers. These substances have been exemplified by tricresyl phosphate, Kronitex 50 (an organic phosphate), di-2-ethylhexyl phthalate, dioctyl sebacate, dimethyl sebacate, and dibutyl sebacate. Said plasticizers will lower the glass point while, at the same time, the stiffness is impaired at room temperature or temperatures above that. In other words, said oligomeric admixtures act in the same way as conventional plasticizers; no essential stiffening or antiplasticizing has been noticed at said conditions.

In addition to the blends formed by PPE and polymers miscible with it, in particular polystyrene, it is known that PPE can be blended with polymers which are immiscible with it. Thus, polyamide 6 (PA6) can be used in amounts of 1 to 6 wt-% for improving the flow properties of PPE. On a molecular level, however, polyamide and PPE do not form miscible blends. The prior art methods for preparing PPE/PA blends are therefore based on grafting PPE with maleic anhydride, which reacts with the terminal amine groups of the polyamide. (Campbell, J. R., Pol. Eng. Sci. Vol. 30(1990) No. 17, 1056). Blends of PPE and PA are used particularly in the automotive industry for applications requiring good chemical stability.

PPE blends with polyolefins have been compatibilized with, for instance, di-block copolymers of saturated styrene and butadiene (EP 0 358 993) or with polypropylene grafted with polystyrene (EP 0 352 057 and EP 0 449 087). Polymers containing glycidyl methacrylate or maleic anhydride are known to be used for compatibilizing PPE-blends. The aforementioned functional groups can react with the terminal hydroxy groups of PPE (EP 0 356 194 and DE 39 26 292).

The prior art also includes teachings of PPE blends formed with polyesters. Polymer 32 (1991) pp. 2150–2154 discloses a complex blending combination, wherein PPE, poly(butylene terephthalate) (PBT), polycarbonate (PC) and a triblock polymer of styrene-ethylene butylene-styrene (SEBS) form a structure, in which PBT is the continuous phase, PPE is modified with the SEBS-elastomer and polycarbonate is present at the interface between the PPE and the PBT.

Furthermore, Polymer 33 (1992) pp. 4322–4330 discloses how aromatic liquid crystalline polymers (LCP) can be used for improving the flow properties of PPE. LCP is not miscible with PPE, but the low melt viscosity of the LCP at high temperatures allows for processing of the PPE. However, the immiscibility gives rise to poor adhesion between the phases. The mechanical properties are therefore not good.

Several oligomeric solvents for PPE are known in the art: benzene, toluene, ethylbenzene, chlorobenzene, chloroform, carbon tetrachloride, trichloroethylene and dichloromethane (Polymer, Vol. 28 (1987), 2085). Decaline has also been suggested as a solvent for PPE (Janeczek, H., Polymer, 19 (1987) January, 85). Furthermore, α-pinene has been mentioned. With the help of some of the above mentioned solvents, partial crystallization of the PPE can be achieved.

PPE is generally only partially soluble in aliphatic hydrocarbons, acetone, several alcohols and tetrahydrofurane. PPE exhibits good resistance against water, acids and alkalis. (Kroschwitz, High Performance Polymers and Composites, John Wiley & Sons 1991, U.S.A). A homogeneous miscible mixture is obtained from toluene and PPE by keeping the proportion of PPE at a maximum of 40 wt-%, when the temperature is raised to 110° C. When the mixture is cooled, some crystallization of the solvent and PPE can possibly be observed (J. Pol. Sci. Pol. Phys. Ed. Vol. 15 (1977) 167).

A homogeneous solution of PPE and methylene chloride can be prepared at room temperature by keeping the concentration at a maximum of 20 wt-%. Bromochloromethane and ethylene bromide and α-pinene and cis- and trans-decaline have also been mentioned as solvents for PPE which can induce crystallization (Pol. Letters, Vol.7 (1969), 205).

In summary, it can be stated on basis of the prior art that it is possible to obtain mechanically satisfying blends of PPE with other polymers
- primarily by using polystyrene and derivatives thereof,
- by using block polymers containing styrene as compatibilizers for, e.g., polyolefins,
- by utilizing terminal group chemistry, PPE being chemically modified with an active group, which reacts with the other polymer, or
- by utilizing the reactivity of the terminal groups of PPE.

Plasticizing of PPE by using oligomeric additives and their influence on the mechanical and physical properties as well as on gas permeability have been studied in the prior art.

The fact that PPE is easily miscible with polystyrene and its derivatives is primarily caused by the formation of a miscible blend. But if PPE is blended with other polymers (which are immiscible with it), such as with polyethylene, according to the prior art the properties of the blends are generally not good, the mechanical strength remains poor and the components of the blends are strongly phase-separated.

For the above reasons there has already for a long time existed a need in polymer technology for providing a way of generally compatibilizing PPE with any matrix polymer, in particular in cases when the miscibility of PPE with a polystyrene block cannot be relied upon.

SUMMARY OF THE INVENTION

It is therefore an object of the present invention to provide a novel solution for plasticizing PPE so that it can be processed together with polymers which are immiscible with it, in order to provide novel PPE-based polymer blends.

The present invention is based on the discovery of specific aromatic or alicyclic interface active substances which surprisingly simultaneously achieve three desired properties: i) they will make PPE processable, ii) they will increase the stiffness of PPE, and iii) they will work as interfacially active substances in respect to other polymers in blends.

Polymer blends according to the invention, which contain the components mentioned in the introduction, therefore have as a component enhancing the compatibility of the polymers 0.1 to 10%, calculated on basis of the total weight of the PPE and the immiscible polymer, of a compound C with the formula $$A_i\text{—}B_j \qquad (I)$$

wherein:
- A is a group which contains at least one 3- to 7-membered ring group capable of forming ring-to-ring interactions with the phenyl rings of the poly(2,6-dimethyl-1,4-phenylene) ether,
- B is a polar group,
- i is an integer 1 to 20, and
- j is an integer 0 to 20, provided that
- the sum of i and j is equal to or greater than 2;
- the melting point of compound C is over 50° C. and its boiling point is over 200° C. (at 760 mmHg) and
- compound C is capable of at least partially dissolving poly(2,6-dimethyl-1,4-phenylene) ether.

In connection with the invention it has been found that PPE dissolves in the above-mentioned cyclic compounds sufficiently rapidly, in comparison to melt processing, as long as the melting temperature is high enough. Thus, 200° C. is an absolute lower limit, the upper limit typically being about 270° C., preferably about 250° C. In other words: an essential prerequisite for dissolution is cyclic structure and sufficiently high temperature. Then the boiling point of the cyclic compound becomes essential. If the substance in itself does not contain polar interactions, its boiling point is low. Therefore, the cyclic compounds according to the invention should contain a polar group which increases the temperature of the cyclic compound so that it becomes suitable for blending.

By means of the invention it becomes possible to produce materials, fibres, coatings, films and similar products from blends of PPE and modified PPE with polymers immiscible therewith.

In connection with the present invention the term "capable of at least partially dissolving PPE" indicates that the blend formed from PPE and a cyclic compound is essentially homogeneous. Then, the PPE and cyclic compound phases are not distinguishable microscopically.

The term "PPE-product" covers PPE, modified PPE polymers and blends of PPE with other polymers.

The blends according to the present invention typically comprise the following components:
i) A PPE phase,
ii) One or more substituted solid oligomeric aromatic or alicyclic compounds, which dissolve PPE due to ring-to-ring interaction and which provides improved processibility of PPE and increases stiffness thereof, i.e., it works as an antiplasticizer and an interfacially active substance in relation to the organic substrate,
iii) One or more organic substrate phases, which do not comprise polyamide.
iv) Other additives, if any.

Within the scope of the present invention it has been found that

PPE can be antiplasticized by using said substituted aromatic or alicyclic additives,
said antiplasticizing provides an increased stiffness of the PPE at the same time as its processibility is improved, and, in particular, it has been found that
said substituted aromatic or alicyclic additives can be functionalized so that they simultaneously antiplasticize PPE and work as interfacially active additives, i.e. compatibilizers, towards the organic substrate phase. Said additives will improve the properties of the blend.

Aromatic compounds have already been used in the prior art for compatibilization of blends formed by PPE and polystyrene or polyamide, respectively. The suggested solutions are based on the fact, which has been disclosed in, for example, U.S. Pat. No. 3,379,792, viz. that the processibility of PPE can be improved by adding 0.1 to 25 wt-% of a polyamide phase. But if the weight ratio of the polyamide is increased above 20 wt-%, the PPE and polyamide phases become phase-separated, which leads to a significant deterioration of the mechanical properties. In order to eliminate this problem several alternative solutions specific for the compatibilization of polyamides and PPE have been suggested in the patent literature.

Thus, U.S. Pat. No. 4,659,763 describes the use of cyclic conjugated diketones for compatibilization of PPE/PA mixtures. The technical effect disclosed in the publication may be related to the fact that said ketones will achieve formation of grafted copolymers of PPE with the polyamides. Alternatively, if no actual chemical bonds are formed, it would appear that the disclosed effect is due to suitable secondary interactions. In both cases it is obvious to a person skilled in the art that the suggested compatibilization method is not applicable as such for compatibilization of PPE and other matrix polymers except for the polyamides. It should be pointed out that compatibilization based on chemical reactions requires chemistry tailor-made for each matrix polymer and admixtures selected on basis of such chemistry. Also the specific interactions of the second alternative are typical for each polymer-polymer-pair or polymer-admixture-pair and even seemingly small changes can lead to big differences in the properties. This is evidenced by the fact that most polymers are not miscible with each other.

Therefore, U.S. Pat. No. 4,659,763 does not provide a general method for compatibilization of PPE with other polymers, such as polyolefins or polyesters, in particular with liquid crystalline polyesters. It must be noted that polyamides/polyolefins and polyamides/liquid crystalline polyesters form immiscible, phase-separated pairs, which shows that said polymers of both the exemplified pairs are different by character.

In summary, it can be stated that even if U.S. Pat. No. 4,659,763 suggests a method for compatibilizing PPE with polyamides, no teaching is provided regarding admixtures or methods that can be used for compatibilizing PPE generally with any polymer, such as a polyolefin or polyester.

BRIEF DESCRIPTION OF THE DRAWING

FIG. 1 shows the viscosities of PPE/tbHQ 95/5- and 90/10-blends as a function of the shearing rate.

DETAILED DESCRIPTION OF THE PREFERRED EMBODIMENTS

The PPE Phase

As the following description will show, it is essential for the present invention that PPE contains aromatic rings. It is therefore obvious to a person skilled in the art that the terminal groups of PPE can be modified while still retaining essentially the same properties as regards dissolution, antiplasticization and compatibilization of the polymer in the solvents mentioned in the present invention.

The Cyclic Phase

The substituted aromatic or alicyclic phase is the decisive feature of the present invention. Said admixture or additive is used in the present invention for two unique purposes: i) as an antiplasticizing agent for providing processibility of PPE and for improving the mechanical properties thereof, and ii) as a component of interfacial activity towards the organic substrate phase.

As mentioned above, the admixture is used in amounts of about 0.1 to 10 wt-%, a particularly preferred concentration range being about 1.5 to 10 wt-%. In small amounts (less than 1%) the admixture mainly acts as a stabilizing agent.

The antiplasticization will manifest itself as, e.g., a lowering of the glass transition temperature as a function of the mixing ratios. The melt viscosity of the PPE will decrease, which can be determined for example by measuring the viscosity with a capillary rheometer. It is therefore possible to make PPE processable by conventional melt processing at temperatures below 300° C., preferably below 270° C.

In contrast to normal plasticization of polymers by using plasticizers, the most important property of the invention is the compatibilization achieved by the admixture. This term signifies a regulation of the interfacial energy of the PPE and the organic substrate phase. According to the invention, the part of the formula $A_i$—$B_j$, which interacts with the PPE, is part A, that is one or several aromatic or alicyclic or heterocyclic rings, which interact with the phenyl rings of PPE by ring-to-ring interaction. This interaction is constituted by van der Waals interaction and its magnitude is typically about 5 to 10 kcal/mol.

Part A can contain 1 to 20 ring structures, but preferably the cyclic compound used is oligomeric, which in this context means that it contains a maximum of 8 to 10 ring groups.

In the above formula each A preferably comprises a substituted 3-, 4-, 5-, 6- and 7-membered aromatic or alicyclic ring, which optionally includes one or several divalent nitrogen, sulphur or oxygen atom(s). Part A then comprises a ring group with at least two rings, for example two fused rings.

Part A is preferably substituted so that it fits together with the organic substrate phase. This functionality is selected depending on the structure of the substrate phase. Thus, for a non-polar polymer, such as polyethylene, a non-polar functionality should be chosen, such as an alkyl, alkenyl, cycloalkyl or phenyl group or a similar group. Together with a polar polymer a polar group should be chosen instead, for example: —OH, —COOH, —COO—, —CO—, —NH$_2$—, —NH—, SO$_2$—,—SH, —S—, SO$_2$NH$_2$—, CONH$_2$, —NHCO—, —PO$_3$—, —NO$_2$, —CN, —CON=, the halogens —F, —Cl, —Br, and —I or a similar group.

Part B preferably comprises a polar group, which gives the cyclic compound a sufficiently high boiling point, i.e. at least over 200° C., preferably over 250° C. and in particular over 270° C. The polar group can be any of the above mentioned polar groups.

Preferred groups of compounds are those compounds, wherein each group of formula (I) is independently a sulphonamide, phenol, benzoic acid, aniline or benzamide, which is substituted by one, two or three substituents independently comprising —H, —OH, —COOH, alkyl, alkenyl, alkoxy, alkanoyl, alkylthio, alkylthioalkyl, alkyl amide, alkylamidealkyl, alkyl hydroxy, alkyl carboxyl, having from 1 to about at least 20 carbon atoms; or alkylaryl, arylalkyl, alkylsulphinyl, alkoxyalkyl, alkylsulphonyl, alkoxycarbonyl, wherein the alkyl or alkoxy has from 0 to about 20 carbon atoms; or alkyl having from 1 to about 20 carbon atoms; or an alkyl with 1 to about 20 carbon atoms and wherein two substituents together may form a 2-, 3-, 4-, 5-, 6- or 7-membered aromatic or alicyclic ring, which ring may optionally include a divalent nitrogen, sulphur or oxygen atom; or a branched tertiary alkyl, having a carbon chain of from 1 to about 20 carbon atoms; or a polar group, such as —NO$_2$, or —CN; or a halogen, such as —F, —Cl, —Br, and —I.

Particularly preferred groups of formula (I) are
phenylphenol, naphthol, cyclohexanephenol, aminophenol, dihydroxybenzene, dihydroxynaphthalene,
  alkylhydroxybenzoate, hydroxyalkylphenone, hydroxyalkyl ether, hydroxyalkylbenzamide,
hydroxyalkoxy benzaldehyde, dihydroxybenzoic acid,
  dialkoxybenzoic acid, alkyl gallate, hydroxydiphenylmethane, phenylsulphoxide, phenylsulphone, phenyldihydroxybenzene, biphenol, bisphenol, hydroxybenzophenone, benzophenone, phenylbenzene-dicarboxylic acid, dihydroxybenzophenone, trihydroxybenzophenone;
aminoalkylamide, alkylaminobenzoate,
  alkylaminobenzaldehyde, dialkylaminobenzaldehyde, phenyldiamine, hydroxybenzamide, alkoxyaniline;
benzoic acid, alkoxybenzoic acid, benzenedicarboxylic acid alkylmonoester;
dicarboxylic acid alkyldiester, dicarboxylic acid diamide, trimellitate;
benzene carboxylic acid or hydroxybenzoic acid.

Particularly preferred compounds are t-butyl hydroquinone, (in position 3) thioalkylated hydroquinones, and the compounds of the following formula:

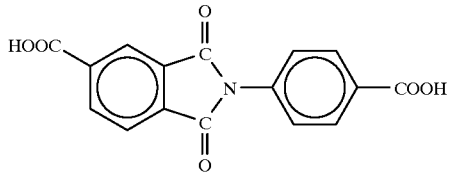

Organic Substrate Phase

This phase comprises either a polymer or a prepolymer or a mixture thereof and it is in a fluidized state during blending.

Except for polyamide the polymer matrix can comprise any suitable polymer material which has the desired properties regarding strength and processability. It can be a thermosetting plastic or a thermoplastic.

As examples of suitable polymers, the following may be mentioned: polyolefins, polyesters and polyether. Suitable polyolefins are represented by polyethylene, polypropylene, polybutylene, polyisobutylene, poly(4-methyl-1-pentylene), including copolymers of ethylene and propylene (EPM, EPDM) and chlorinated (PVC) and chlorosulphonated polyethylenes. The polymer substrate may also comprises the corresponding polyalkanes, which contain styrene (PS), acryl, vinyl and fluoroethylene groups, and different polyesters, such as poly(ethylene terephthalate), poly (butylene terephthalate) and polycarbonate, polyamides and polyethers (e.g. poly(phenylene ether). Particularly preferred polymers are the polyolefins and polyesters.

The organic substrate phase may also contain a liquid crystalline polymer (or it may consist of such a polymer).

The liquid crystalline polymer may, for instance, comprise an aromatic main chain thermotropic polymer, preferably a thermotropic polyester, poly(ester amide), poly(ester ether), poly(ester carbonate) or poly(ester imide). It can also comprise a copolymer of a polyester, such as a copolymer of poly(ethylene terephthalate) and hydroxybenzoic acid or a copolymer of hydroxynaphthoic acid and hydroxybenzoic acid.

Generally, the liquid crystalline polymer, which is used in the present invention, can be defined as a polymer which is formed when the components following general formulas (or at least two of them) are reacted with each other: a dicarboxylic acid of formula (II)

$$\text{HOOC—R}_1\text{—COOH} \qquad (II)$$

a diol of formula (III)

$$\text{HO—R}_2\text{—OH} \qquad (III)$$

a hydroxycarboxylic acid of formula (IV)

$$\text{HO—R}_3\text{—COOH} \qquad (IV)$$

wherein
R$_1$, R$_2$, and R$_3$ each independently represents a bivalent aromatic hydrocarbon group,
a group of formula R$_4$—X—R$_5$, wherein R$_4$ and R$_5$ represent a bivalent hydrocarbon group and X is an oxygen or a sulphur atom, a sulphonyl, carbonyl, alkylene, or ester group or X is a single bond,
a xylylene group or
a bivalent aliphatic hydrocarbon group.

The liquid crystalline polymer can also comprise a homopolymer of a hydroxycarboxylic acid of formula (V)

$$\text{HO—R}_3\text{—COOH} \qquad (V).$$

Typically, the aromatic dicarboxylic acids of formula (II) comprise terephthalic acid, isophthalic acid, 4,4'diphenyl-dicarboxylic acid, diphenyl ether-4,4'-dicarboxylic acid, diphenylethane-3,3'-dicarboxylic acid, diphenylethane-4,4'-dicarboxylic acid, diphenyl ether-3,3'-dicarboxylic acid, 4,4'-triphenyl-dicarboxylic acid, 2,6-naphthalenedicarboxylic acid, diphenoxyethane-4,4'-dicarboxylic-acid,diphenoxybutane-4,4'-dicarboxylic acid, diphenoxyethane-3,3'-dicarboxylic-acid, and naphthalene--1,6-dicarboxylic acid.

Said aromatic dicarboxylic acids may be alkyl-, alkoxy-, or halogen-substituted. The substituted derivatives comprise chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

The alicyclic dicarboxylic acids of formula (II) comprise trans-1,4-cyclohexanedicarboxylic acid, cis-1,4-cyclohexanedicarboxylic acid, and 1,3-cyclohexanedicarboxylic acid.

The alicyclic dicarboxylic acids may also be substituted by one or more alkyl-, alkoxy-, or halogen-substituent(s). The substituted dicarboxylic acid derivatives comprise trans-1,4-(1-methyl)-cyclohexane-dicarboxylic acid and trans-1,4-(1-chloro)cyclohexane-dicarboxylic acid.

The aromatic diols of formula (III) comprise hydroquinone, resorcinol, 4,4'-dihydroxydiphenyl, 4-4'-dihydroxytriphenyl, 1,6-naphthalenediol, 2,6-naphalenediol, 4,4'-dihydroxydiphenyl ether, 3,3'-dihydroxydiphenyl, 1,1-bis(4-hydroxyphenyl)-methane, bis(4-hydroxyphenoxy)-ethane, 2,2-bis(4-hydroxyphenyl) propane, and 3,3'-dihydroxy-diphenyl ether. These diols may be substituted by one or more alkyl-, alkoxy-, or halogen substituent(s), which derivatives are exemplified by the following list: chlorohydroquinone, methylhydroquinone, 1-butyl hydroquinone, phenylhydroquinone, methoxy-hydroquinone, phenoxyhydroquinone, 4-chlororesorcinol, and methylresorcinol.

Typical examples of alicyclic diols of formula (III) include trans- and cis-1,4-cyclohexanediols, trans-1,4-cyclohexane-dimethanol, trans-1,3-cyclohexanediol, cis-1,2-cyclohexanediol, and trans- 1,3-cyclohexanedimethanol.

Instead of these compounds the corresponding alkyl-, alkoxy-, or halogen-substituted derivatives can be used, as well.

The aliphatic diols of formula (III) can be straight-chained or branched and comprise ethylene glycol, 1,3-propanediol, 1,4-butanediol, and neopentyl glycol.

The aromatic hydroxycarboxylic acids of formula (IV) comprise 4-hydroxybenzoic acid, 3-hydroxybenzoic acid, 6-hydroxy-2-naphthoic acid, and 6-hydroxy-1-naphthoic acid. These compounds can be alkyl-, alkoxy-, or halogen-substituted. The substituted aromatic hydroxycarboxylic acid derivatives preferably comprise 3-methyl-4-hydroxybenzoic acid, 3,5-dimethyl-4-hydroxybenzoic acid, 2,6-dimethyl-4-hydroxybenzoic acid, 3-methoxy-4-hydroxy-benzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2,3-dichloro-4-hydroxybenzoic acid, 3,5-dichloro-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro--2-naphthoic acid.

In addition to the above mentioned polyesters, the LC-polymers used in the invention can comprise the corresponding polyester amides. It is also possible to use polymers having a main chain containing conjugated double bonds, the monomer units of said main chain being linked to unsubstituted or substituted side chains which, together with the main chain render the polymer liquid-crystal properties. Examples of such polymers are polytiophene, polyaniline, polyacetylene, polypyrrole and polyparaphenylene substituted with alkyl chains containing at least 8 carbon atoms.

Particularly preferred liquid crystalline polymers are represented by the copolymer of poly(hydroxy benzoate) and hydroxy naphthoic acid and poly(ester imide), the latter being described in more detail in WO Published Patent Application No. 94/06846. Poly(ester imide)s and several other main chain liquid crystalline polymers and PPE are structurally similar and fit well together, which makes it possible to replace a part of the PPE with a poly(ester imide). Alternatively, the poly(ester imide) can be used even in small amounts to improve the strength properties of PPE (i.e. the poly(ester imide) can be used for PPE upgrading).

The molecular weights of the preferred thermoplastic polymers are usually in a range from about 5,000 to 50,000, preferably about 10,000 to 30,000. The flexural modulus (0.5–0.25%) of the matrix polymer is preferably about 100–10,000 MPa, in particular about 500–5,000 MPa.

Other Potential Admixtures

It is clear to a person skilled in the art that said mixture can be complemented with admixtures comprising inert, solid fillers, such as talc, carbon black or corresponding fillers, or with fibrous admixtures, such as glass fibres, carbon fibres or organic fibres. It is further obvious to a person skilled in the art that stabilizing agents and similar agents, which do not essentially affect the effect of the present invention, can be added to the mixture.

Preparation and Processing of the Polymer Blends

The blends according to the invention are prepared by mixing together the components of the polymer blend at a temperature in the range from 200 to about 270° C. Desired end products can be formed from the mixtures in manners known per se. Generally the components of the polymer blend are first mixed together to form a blend, to which admixtures and adjuvants are optionally added. Then the polymers are compounded by melt processing. Applicable blending processes include batch and continuous processes. Preferably single- or twin-screw extruders are used for compounding PPE with thermoplastics.

The blends according to the invention are processed by methods known per se in polymer technology for preparing the final products.

Considerable advantages are obtained by the invention. Thus, by blending PPE with other polymers using as admixtures or compatibilizers cyclic solid compounds which have a functional group which fits in with the other polymers, blends are obtained which have advantageous mechanical and thermal properties. These compounds, which plasticize PPE, also increase the stiffness and tensile strength of PPE, promote its melt processing (which is partially due to the lowered viscosity of the PPE) and improve the morphology thereof. The structure of the polymer blends becomes more homogeneous and the stiffness and tensile strength are improved by the addition of the compatibilizers.

The modulus of elasticity is at least 10% greater than for polymer blends which do not contain component C, which has instead been replaced by the corresponding amount of component b.

The general method disclosed in the present invention makes it possible to adjust the properties of PPE blends for each specific application by selecting one or more suitable matrix polymers, one or more compatibilizers which fit with it and with PPE, and furthermore, possibly, a solid non-melting admixture, such as talc or glass fibre and to optimize the proportions of the aforementioned components according to the set requirements.

Further advantages and features of the invention will appear from the following working examples.

EXAMPLES

Example A (comparative example) shows that the method of plasticizing PPE is critical when good mechanical properties are sought.

Example 1 discloses some cyclic substances which lower the glass transition point of PPE. Aromatic compounds with a melting point above 50° C. and a high boiling point, which preferably is over 200° C., in particular over 250° C., have been studied by determining their influence on the glass transition point of PPE. It is commonly known that if there is a strong interaction between two organic compounds then their glass transition temperatures will shift closer towards each other. In particular, if two components are completely miscible on a molecular level, they will only have one common glass transition temperature.

Example 2 shows that the miscibility of PPE and tert-butyl hydroquinone is not a phenomenon which will appear at certain temperatures only.

Example 3 is a counter example for Example 1.

Example 4 indicates that tert-butyl hydroquinone will function as a plasticizer for PPE at various mixing ratios. Dissolution and a decrease of viscosity and also an increase in the stiffness of PPE can be noticed as the amount of tert-butyl hydroquinone is increased.

Example 5 shows at one mixing ratio that hydroquinone will work in the same way as a plasticizer for PPE.

In Example 6 it has been found that tert-butyl hydroquinone works as a compatibilizer in blends of PPE and HDPE. As the amount of the tert-butyl hydroquinone increases, the stiffness and the tensile strength of the blends will increase.

Example 7 shows that decyl hydroquinone works in a corresponding way in PPE/HDPE blends as tert-butyl hydroquinone in an experiment carried out at one mixing ratio.

Example 8 shows that tert-butyl hydroquinone works as a compatibilizer between PPE and an LCP. The LCP used in the example is a copolymer of hydroxynaphthoic acid and hydroxybenzoic acid.

Example 9 concerns the preparation of blends based on PPE and poly(ester imide)s.

Example A

(Comparative Example)

PPE (supplied by Research Institute of Macromolecular Chemistry) was plasticized using high impact polystyrene HIPS (Neste SB 735). The amount of HIPS varied from 30 wt-% to 80 wt-%, the minimum value being set by technical limitations of the apparatus used: the smaller the amount of HIPS the more difficult the melt processing. Said binary mixture was blended in a Berstorff ZE 25 twin-screw mixer at a temperature of 270° C. using a rotation speed of 300 rpm. A blend consisting of 50 weight-% PPE and 50 weight-% HIPS was plasticized to form one phase, which had a glass point of 141.6° C., a modulus of elasticity of 2.53 GPa, a tensile strength of 63 MPa, an elongation at break of 21%, a notched Charpy impact resistance (at 23° C.) of 10.6 kJ/m² and a notched Charpy impact resistance (at -40° C.) of 4.5 kJ/m². In other words the plasticized PPE had rather a good impact tolerance and was rather stiff.

Under the same conditions, 25 weight-% PPE, 25 weight-% HIPS and 50 weight-% polypropylene (PP) (Neste VC 12 12 H) were mixed. The blend prepared had a modulus of elasticity of 1.64 GPa, a tensile strength of 20.3 MPa, an elongation at break of 2.6%, a notched Charpy impact resistance (at 23° C.) of 1.3 kJ/m², a notched Charpy impact resistance (at -20° C.) of 1.1 kJ/m².

Furthermore, a mixture of 35 weight-% PPE, 35 weight-% HIPS and 30 weight-% polypropylene (PP) (Neste VC 12 12 H) was prepared under the same conditions. The blend had a modulus of elasticity of 1.78 GPa, a tensile strength of 24.6 MPa, an elongation at break of 2.4%, a notched Charpy impact resistance (at 23° C.) of 1.2 kJ/m², a notched Charpy impact resistance (at -20° C.) of 0.9 kJ/m².

Both PPE/HIPS/PP blends had a morphology characterized by a strong phase-separation. The impact resistance was very poor. Likewise was the stiffness poor. It can be concluded that the way in which the plasticizing and compatibilizing is achieved is essential and critical to the properties of PPE blends formed with polyolefins.

Example 1

PPE ($M_w$ 41,200, $M_n$ 21,700, supplied by Asahi Chemicals) was mixed with different aromatic compounds in a 5 g single-screw mixer operated batch-wise using $N_2$ as protective gas. The mixing temperatures (T) are mentioned in Table 1. The mixing time was constantly 30 minutes. The mix was analyzed by DSC using a scanning rate of 20° C./min. The glass transition temperatures were determined by DSC. The glass transition temperature, $T_g$, of pure PPE is 211° C. The analysis results are collected in Table 1. The results show that the aromatic compounds will provide a strong decrease of the glass transition temperature of PPE, because they act as solvents for PPE. Only one $T_g$ can be observed for all samples, except for those in which the solvents had caused the formation of a crystalline phase. In the latter case, no glass transition temperature could be observed.

TABLE 1

Blends of PPE and some organic compounds

| Compound | Ratio of PPE (weight-%) | T (° C.) mixing | $T_g$ (° C.) | Comments |
|---|---|---|---|---|
| Hydroquinone | 50 | 270 | | crystalline |
| t-Butyl hydroquinone | 50 | 270 | 48 | |
| Resorcinol | 50 | 270 | 157 | |
| Catechol | 50 | 270 | 142 | |
| Bisphenol-A | 50 | 270 | 136 | |
| Phenylhydroquinone | 50 | 270 | 126 | |
| 2-Phenylphenol | 50 | 270 | 108 | |
| Benzoic acid | 50 | 270 | 78 | |
| 4-Hydroxy-benzophenone | 50 | 270 | 116 | |
| 2,4-Dihydro-benzophenone | 50 | 270 | 129 | |
| 3-Hydroxy-benzoic acid | 50 | 270 | | crystalline, dissolved |
| Phenyl terephthalic acid | 50 | 300 | 192 | |
| 2-Hydroxy-6-naphthoic acid | 50 | 300 | | crystalline, dissolved |
| Benzamide | 50 | 270 | 60 | |
| o,p-Toluene-sulphonamide | 50 | 270 | | crystalline, dissolved |
| N-Phenyl-1,4-phenylene-diamine | 50 | 270 | 82 | |
| Phenothiazine | 50 | 270 | | crystalline, dissolved |

Example 2

PPE and tert-butyl hydroquinone were mixed at a mixing ratio of 75/25 in a 5 g single-screw mixer at two temperatures, 300° C. and 200° C., using a mixing time of 20 minutes in an $N_2$ protective gas atmosphere. In both cases, one glass point was obtained at a temperature of 110°

C. Both mixing temperatures produced systems which were miscible on a molecular level.

Example 3
(Outside of the Invention)

A non-aromatic solvent which does not dissolve PPE under the experimental conditions observed.

A mixture of 50 wt-% PPE (Asahi $M_w$ 41,200, $M_n$ 21,700, produced by Asahi Chemicals) and 50 wt-% stearic acid (Aldrich) was prepared in a 5 g single-screw mixer operated batch-wise at a temperature of 270° C. using $N_2$ as protective gas. The mixing time was 20 min. DSC-analysis showed that the glass transition temperatures of both components were completely separate and unchanged, which indicates that PPE and stearic acid are not miscible on a molecular level. Said aliphatic organic compounds are not miscible with PPE and do not act as plasticizers for it.

Example 4

PPE and tert-butyl hydroquinone (tbHQ) were mixed at mass ratios of 90/10, 95/5 and 97.5/2.5 in a corotating twin-screw extruder Berstorff ZE 25 at a temperature of 270° C. using $N_2$ as a protective gas. The screws of the extruder comprised mixing and conveying means arranged in a specific order. The blends were injection moulded and tested according to ISO standards for tensile modulus (E), yield strength ($\sigma_y$) and maximum elongation ($\epsilon_{max}$): ISO/R527; flexural modulus (G): ISO 178; Charpy notched impact resistance: ISO 179/1D at +23° C.; and HDT/B: ISO 75. Table 2 contains a summary of the test results for the blends.

TABLE 2

| PPE/tbHQ | E (GPa) | $s_y$ (MPa) | $e_{max}$ (%) | G (GPa) | notched impact (kJ/m²) | HDT/B (° C.) | $T_g$ (° C.) |
|---|---|---|---|---|---|---|---|
| 97.5/2.5 | 2.34 | 80.5 | 105 | 2.55 | 3.5 | 176 | 190 |
| 95/5 | 2.56 | 81.8 | 41 | 2.58 | 3.1 | 163 | 175 |
| 90/10 | 2.6 | 81.9 | 37 | 2.63 | 2.8 | 142 | 155 |

FIG. 1 contains graphical presentations of the viscosities of the 95/5 and 90/10 blends determined by capillary rheometry. The determinations were made at a temperature of 270° C.

Table 2 and FIG. 1 show that tert-butyl hydroquinone plasticizes PPE. As a result, the viscosity of PPF decreases so that it becomes readily processable by conventional melt processing methods, such as injection moulding or extrusion.

Example 5

Example 4 was repeated by using hydroquinone instead of tert-butyl hydroquinone. The weight ratio of PPE to hydroquinone was 95/5. Again PPE became readily processible. The mechanical properties of the blend are as follows: tensile modulus 2470 MPa, yield strength 71 MPa, maximum elongation 66%, flexible modulus 2470 MPa, notched impact resistance 2.0 kJ/m². The glass transition temperature was 181° C. These results show that hydroquinone also acts as a plasticizer for PPE.

Example 6

HDPE (NCPE 7003, Neste) and PPE (Asahi Chemicals) were mixed in a corotating twin-screw mixer Berstorff ZE 25 at a temperature of 270° C. using $N_2$ as a protective gas. The blends were dried (at 80° C. overnight) before injection moulding. The injection moulded specimens were tested according to the ISO standards mentioned in Example 4 after they had first been stored for 2 days in a conditioning room. The mechanical properties of the blends are given in Table 3.

TABLE 3

Mechanical properties of HDPE/PPE blends

| PPE (wt %) | HDPE (wt %) | tbHQ (wt %) | E (GPa) | σ (MPa) | ε (%) | G (GPa) | L-Charpy (kJ/m²) +23° C. | L-Charpy (kJ/m²) +23° C. |
|---|---|---|---|---|---|---|---|---|
| 40 | 60 | — | 1.57 | 33.1 | 4.8 | 1.56 | 6.0 | 5.0 |
| 40 | 58 | 2 | 1.62 | 35.0 | 6.4 | 1.62 | 5.7 | 4.7 |
| 40 | 56 | 4 | 1.75 | 37.9 | 4.6 | 1.68 | 7.3 | 6.8 |

The morphology of the polymer blends was inspected by scanning electron microscopy (SEM) at the temperature of liquid nitrogen on a fractured surface. The microscopy clearly indicated that without tbHQ, the adhesion and miscibility of HDPE and PPE was poor. The average particle size of the dispersed phase was over 10 micrometers. When 2.0 wt-% of tert-butyl hydroquinone had been added to the blend, the morphology was radically changed; the average particle size of the dispersed phase was now only 2 to 5 µm on an average. If the amount of the tert-butyl hydroquinone was 4 wt-%, the average particle size was only 1 to 3 µm.

It can be concluded that i) tbHQ works as an interfacially active agent between PPE and HDPE, ii) it stiffens the blend by antiplasticizing PPE, iii) it increases the impact strength at room temperature and at low temperatures and iv) it makes the morphology more homogeneous.

Example 7

The HDPE/PPE blend of Example 6 was repeated by using decyl hydroquinone instead of butyl hydroquinone. The decyl hydroquinone was synthesized from decene and hydroquinone by an acid-catalyzed reaction.

The mechanical properties of a blend containing 40 wt-% PPE, 56 wt-% HDPE and 4 wt-% decyl hydroquinone were the following: tensile modulus 1670 MPa, yield point 38.4 MPa, maximal elongation 5.3%, flexural modulus 1630 MPa, Charpy notched impact resistance 7.0 kJ/m² at +23° C. and 7.7 kJ/m² at −20° C. It can be noted that decyl hydroquinone also works as a compatibilizer in blends of PPE and HDPE on the same basis as in example 6.

Example 8

Blends of PPE (Asahi Chemicals) and an LCP (Vectra A, Hoechst Celanese) were prepared without admixtures and with tert-butyl hydroquinone. The blends were prepared as described in Example 6 using a melting temperature of 290° C. The blends were dried and injection moulded. The mechanical testing was carried out according to the standards listed in Example 4. The properties are indicated in Table 4.

TABLE 4

Mechanical properties of PPE/LCP blends

| PPE (wt %) | LCP (wt %) | tbHQ (wt %) | E (GPa) | σ (MPa) | ε (%) | G (GPa) | L-Charpy (kJ/m$^2$) +23° C. | L-Charpy (kJ/m$^2$) +23° C. |
|---|---|---|---|---|---|---|---|---|
| 40 | 60 | — | 6.41 | 109 | 2.7 | 6.56 | 29 | 5.0 |
| 40 | 56 | 4 | 7.28 | 113 | 2.3 | 7.30 | 19.4 | 6.8 |

The results indicate a clear increase of the tensile modulus and flexural strength and tensile strength.

Example 9

Example 8 was repeated using the liquid crystalline polymers of Examples 2 and 9, respectively, of WO Published Patent Application No. 94/06846. The amounts of the LCP were in the range of 5 to 95 wt-% and the amounts of the PPE in the range of 95 to 5 wt-%. The first of the LCP's used was prepared by condensation of trimellite-imide terminated poly(THF) with an acetoxy-terminated trimer of formula HBA-HQ-HBA and with p-acetoxybenzoic acid. The other LCP comprises the corresponding polymer prepared from trimellite-imide terminated silicone.

It can be noticed from the polymer blends that PPE can be replaced even with rather large amounts of poly(ester imide) without substantially impairing the strength properties of the polymer. However, already by the addition of small amounts (5 to 10 wt-%) of poly(ester imide) to the blend, a clear improvement of the tensile modulus and the flexural strength and the tensile strength of the PPE can be obtained.

What is claimed is:

1. A polymer blend comprising:
   a) 5 to 95 parts by weight of poly(2,6-dimethyl-1,4-phenylene) ether;
   b) 95 to 5 parts by weight of a second polymer which is immiscible with said ether; and
   c) 0.1 to 10 wt.-%, based on the weight of the ether and second polymer, of at least one component which enhances the compatibility of the ether of a) and the polymer of b), said component comprising hydroquinone having a substituent, wherein the substituent is selected from the group consisting of alkyl, alkenyl, alkoxy, alkanoyl, alkylthio, alkylthioalkyl, alkyl amide, alkylamidealkyl, alkyl hydroxy, alkyl carboxyl, having from 1 to about at least 20 carbon atoms; or alkylaryl, arylalkyl, alkylsuphinyl, alkoxyalkyl, alkylsulphonyl, alkoxycarbonyl, wherein the alkyl or alkoxy has up to 20 carbon atoms, or the alkyl substituent is a branched tertiary alkyl having a carbon chain of from 1 to about 20 carbon atoms, or the substituent contains a polar group or a halogen.

2. The polymer blend of claim 1 wherein the least one component is present in the blend in an amount of about 1.5 to 10 wt.-%.

3. The polymer blend of claim 1 wherein the second polymer is a polyolefin.

4. The polymer blend of claim 3 wherein the substituent is alkyl or tert-butyl.

5. The polymer blend of claim 1 wherein the substituent is tert-butyl.

6. The polymer blend of claim 1 further comprising unmelted fillers.

7. The polymer blend of claim 1 wherein the elasticity modulus of the blend is at least 10% greater than that of a polymer blend which does not contain the compatibility enhancing component which has instead been replaced by a corresponding amount of said second polymer.

8. A fiber comprising a polymer blend according to claim 1.

9. A coating comprising a polymer blend according to claim 1.

10. A film comprising a polymer blend according to claim 1.

11. A process for preparing a polymer blend of claim 1, comprising blending together at a temperature of at least 200° C.
   a) 5 to 95 parts by weight of poly(2,6-dimethyl-1,4-phenylene) ether,
   b) 95 to 5 parts by weight of a second polymer which is imnmiscible with said ether, and
   c) 0.1 to 10 wt.-%, based on the weight of the ether and second polymer, of at least one component which enhances the compatibility of the ether of a) and the polymer of b), said component comprising hydroquinone having a substitutient, wherein the substituent is selected from the group consisting of alkyl, alkenyl, alkoxy, alkanoyl, alkylthio, alkylthioalkyl, alkyl amide, alkylamidealkyl, alkyl hydroxy, alkyl carboxyl, having from 1 to about at least 20 carbon atoms; or alkylaryl, arylalkyl, alkylsuphinyl, alkoxyalkyl, alkylsulphonyl, alkoxycarbonyl, wherein the alkyl or alkoxy has up to 20 carbon atoms, or the alkyl substituent is a branched tertiary alkyl having a carbon chain of from 1 to about 20 carbon atoms, or the substituent contains a polar group or a halogen.

12. The process of claim 11 wherein the components are blended together at a temperature of from 200 to 270° C.

13. The process of claim 12 wherein the temperature is from 200 to about 250° C.

* * * * *